(12) United States Patent
Maruoka (10) Patent No.: US 7,513,283 B2
(45) Date of Patent: Apr. 7, 2009

(54) HEAVY DUTY TIRE

(75) Inventor: Kiyoto Maruoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 62 days.

(21) Appl. No.: 11/360,693

(22) Filed: Feb. 24, 2006

(65) Prior Publication Data

US 2006/0207711 A1    Sep. 21, 2006

(30) Foreign Application Priority Data

Mar. 18, 2005 (JP) ............................ 2005-079884
Mar. 29, 2005 (JP) ............................ 2005-095376

(51) Int. Cl.
*B60C 15/00* (2006.01)
*B60C 15/06* (2006.01)

(52) U.S. Cl. .................... 152/539; 152/542; 152/546; 152/547; 152/552

(58) Field of Classification Search ................ None
See application file for complete search history.

(56) References Cited

U.S. PATENT DOCUMENTS 4,721,144 A * 1/1988 Hara et al. ............... 152/541

6,752,188 B2 * 6/2004 Ohara et al. ............. 152/540

FOREIGN PATENT DOCUMENTS

| JP | 01036509 | * | 2/1989 |
| JP | 11-321244 A | | 11/1999 |
| JP | 2001-191754 | * | 7/2001 |
| JP | 2001-246675 A | | 9/2001 |
| JP | 2001-246676 A | | 9/2001 |
| JP | 2002-59716 A | | 2/2002 |
| JP | 2003104016 | * | 4/2003 |

* cited by examiner

*Primary Examiner*—Justin Fischer
(74) *Attorney, Agent, or Firm*—Birch, Stewart, Kolasch & Birch, LLP (57) ABSTRACT

The present invention relates to a heavy duty tire being capable of preventing positional shift of carcass cords in the blowout direction while restricting rupture of the carcass cords for improving bead durability. A ply turnup portions 6b of a carcass 6 includes a sub-portion 11 that extends proximate of an upper surface SU of a bead core 5 in a tire radial direction upon inclining towards a ply main body portion 6a and further includes an auxiliary cord layer 20 for pressing the sub-portion outside thereof in the radial direction. A bead portion 4 is further provided with a U-shaped bead reinforcing layer 15. A periphery of the bead core 5 is coated by a reinforcing rubber layer 15 made of high elastic rubber having a complex elastic modulus $E^*a$ of 20 to 70 MPa, and a rubber thickness $T0$ of a clearance portion G at which bead wires 5w and carcass cords 20 are adjacent is defined to be not less than 0.7 mm while a cushion rubber layer 16 made of low elastic rubber layer 16 is interposed between the reinforcing rubber layer 15 and the carcass cords 20.

7 Claims, 9 Drawing Sheets

PRIOR ART

FIG.9(B)

PRIOR ART

FIG.9(C)

PRIOR ART

HEAVY DUTY TIRE

BACKGROUND OF THE INVENTION

1. Field of the Invention

The present invention relates to a heavy duty tire in which bead durability is improved by restricting blowout of carcass cords while also restricting deformation of bead cores at bead portions of bead-wind structure.

2. Description of the Related Art

Figure 9A:
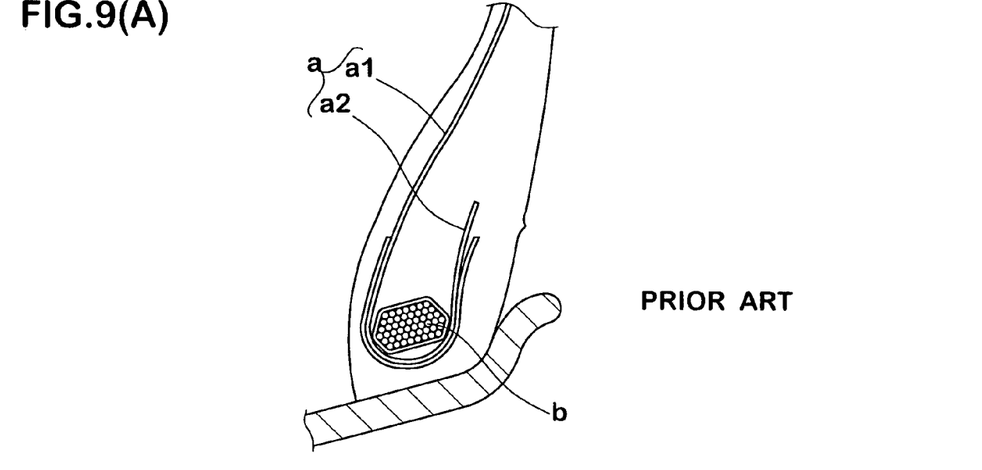
FIGS. 9(A), 9(B) and 9(C) are sectional views for explaining a conventional bead portion.
Figure 9B:
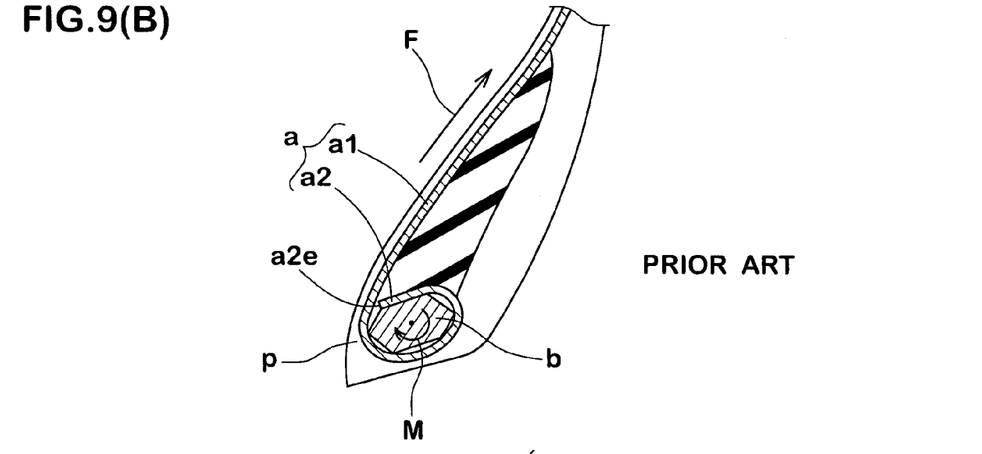

A carcass ply a that constitutes a framework of a tire is generally arranged, as illustrated in FIG. 9(A), in that it is engaged by providing turnup portions a2 which are turned over around the bead cores b, on both sides of a ply main body portion a1 that bridges between bead cores b, b. For the purpose of improvements such as weight saving of the bead cores, it has been recently suggested a structure as disclosed in Japanese Published Patent Application No. 11-321244 of a heavy duty tire employing a carcass ply a constituted from steel cords in which, as illustrated in FIG. 9(B), ply turnup portions a2 are continuously formed at the ply main body portion a1 in which the ply is wound around the bead cores b by approximately one round. Such a structure is referred to as a so-called "bead-wind structure", and this term is used also in the present specification.

In such a structure, the ply turnup portions a2 end around the bead cores b. This will accordingly be of advantage in that hardly any stress acts onto tip ends a2e thereof at the time of deformation of the beads so that damages such as cord loosening originating at the tip ends a2e can be effectively prevented.

At the same time, the ply turnup portions a2 are wound at a small radius of curvature in such a structure. As a result, so-called spring back is apt to strongly occur in which the carcass cords (steel cords) try to restore their original different shape, and the shape of the carcass cords tends to be unstable. Particularly in case such spring back happens during green tire molding processes, clearances are apt to be formed between the ply turnup portions a2 and the bead cores b and defective moldings such as air residues are caused.

On the other hand, it would be possible to deform the ply turnup portions a2 through a modeling means in this "bead-wind structure" for firmly winding the ply around the bead cores b. In such an instance, the ply turnup portions a2 constraint the bead cores b as illustrated in FIG. 9(B). Through tension force F that is applied to the carcass cords, a strong rotation moment M is generated around the bead cores. This rotation moment M causes core deformations such as arrangement confusions (alignment shifts) of the bead wire around the bead cores b. It may also make a contact pressure between corner portions p on bead toe sides of the bead cores b with the carcass cords becomes large to cause fretting that may lead to breaks in cords.

Particularly in the bead-wind structure, the bead core b is deformed in a direction in which it rotates around the sectional center thereof through the rotational moment M. For restricting such rotational deformation, it will be desirable to achieve flattening of the bead cores. However, such flattening of the bead cores will cause a tendency in encouraging bead deformation and occurrence of fretting.

Figure 9C:
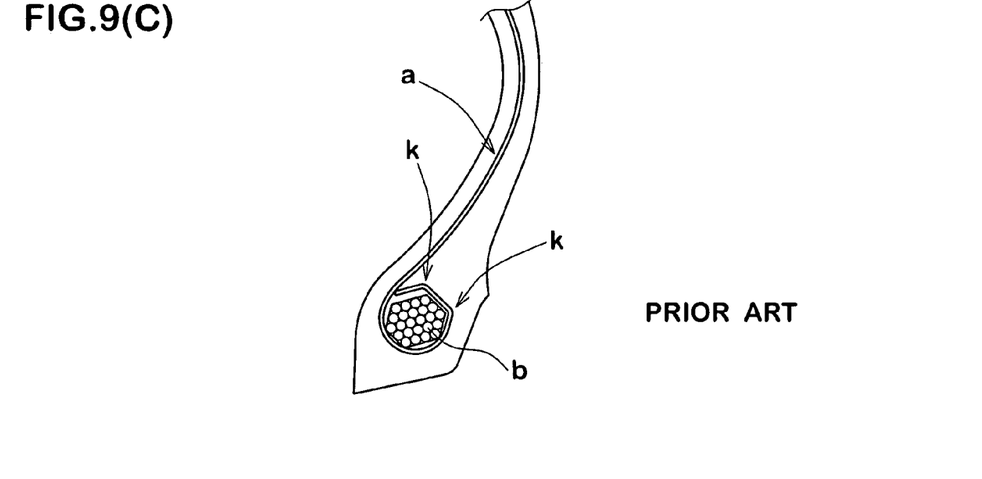

Accordingly, Japanese Published Patent Application No. 2001-246675 and Japanese Published Patent Application No. 2000-219016 have suggested forming a bent portion k are preliminarily formed at the carcass ply a through plastic deformation in which carcass cords are partially bent and molded at positions that suit corner portions of the bead cores b as illustrated in FIG. 9(C). However, when partial molding (partial deformation using a die) of the carcass cords is performed, the cord strength will be degraded through the partial bending to result in early rupture of the cords, and it will become difficult to secure sufficient bead durability.

In this respect, Japanese Published Patent Application No. 2002-59716 discloses an arrangement in which a reinforcing layer is provided outside of the ply turnup portions for preventing blowout by clamping the ply turnup portions.

BRIEF SUMMARY OF THE INVENTION

One of the objects of the present invention is to provide a heavy duty tire capable of restricting rupture of carcass cords over a long period of time while preventing blowout of carcass cords for improving bead durability.

It is another object of the present invention to provide a heavy duty tire capable of restricting core deformation such as arrangement confusions (alignment shifts) of bead wires and fretting of carcass cords for improving bead durability.

To achieve the object of the invention, the present invention is a heavy duty tire, comprising:

a ply main body portion; and a carcass ply including ply turnup portions that continue to the ply main body portion, wherein the ply main body portion extends over sidewall portions to bead cores of bead portions while the ply turnup portions continue to the ply main body portion and are turned over from inward to outward in a tire axial direction around the bead cores, wherein each of the ply turnup portion includes a main portion that curves along an inner surface inside of the bead core in the tire axial direction, a lower surface SL inside in a tire radial direction, and an outer surface outside in the tire axial direction, and a sub-portion that continues from the main portion and that extends while inclining towards the ply main body portion proximate of an upper surface of the bead core that faces outside in the tire radial direction, wherein the ply turnup portion is turned over around the bead cores without including partial bent portions, wherein an auxiliary cord layer for pressing the sub-portion is provided outside of the sub-portion in the tire radial direction, the auxiliary cord layer being formed by winding steel cords by at least one round around the sub-portion in a tire circumferential direction, wherein the sub-portion is arranged in that a distance La between its tip end and the upper surface of the bead core is defined to be in a range of 1.0 to 10 mm and in that a distance d between the tip end and an outer end of the bead core in the tire axial direction in a direction parallel to the upper surface of the bead core is not less than 5 mm, and wherein each bead portion is provided with a bead reinforcing layer, the bead core reinforcing layer including a curved portion, an outer piece and an inner piece, the curved portion extending along the main portion of the ply turnup portion and inside thereof in the radial direction, the outer piece parting from the main portion outside of the curved portion in the tire axial direction, the inner piece extending inside of the curved portion in the tire axial direction, while a height Hi of the inner piece in the radial direction from a bead base line is defined to be larger than a height Ho of the outer piece in the radial direction from the bead base line, the height Ho being not less than 25 mm.

As a result of such a structure, it will be possible to restrict spring back without accompanying formation of partial bent portions or partial deformation of the carcass cords. It will accordingly be possible to restrict blowout of carcass cords while restricting defective moldings originating from air residues or rupture of cords.

In this respect, the sub-portions are not strongly pressed by the auxiliary cord layer in an adhering manner onto the top surface of the bead cores. With this arrangement, the degree of bending of the carcass cords can be eased for preventing partial bending of the carcass cords through the auxiliary cord layer so that rupture of cords can be prevented.

Moreover, rubber is interposed between the sub-portions and the bead core outer surfaces for securing a distance La in a range of 1.0 to 10 mm. With this arrangement, a tendency of positional shift of the carcass cords in the blowout direction is prevented through tension force that acts at the time of deformation of the tire, and by providing a bead reinforcing layer, positional shift of the carcass cords in the blowout direction is restricted for achieving improvements in bead durability.

And the another invention is a heavy duty tire, comprising:
a ply main body portion; and
a carcass ply including ply turnup portions that continue to the ply main body portion,
wherein the ply main body portion extends over sidewall portions to bead cores of bead portions while the ply turnup portions continue to the ply main body portion and are turned over from inward to outward in a tire axial direction around the bead cores,
wherein each of the ply turnup portion includes a main portion that curves along an inner surface inside of the bead core in the tire axial direction, a lower surface SL inside in a tire radial direction, and an outer surface outside in the tire axial direction, and
a sub-portion that continues from the main portion and that extends while inclining towards the ply main body portion proximate of an upper surface of the bead core that faces outside in the tire radial direction,
wherein the ply turnup portion is turned over around the bead core without including partial bent portions,
wherein an auxiliary cord layer for pressing the sub-portion is provided outside of the sub-portion in the tire radial direction,
wherein a circumference of the bead core is coated with a reinforcing rubber layer including high elastic rubber having a thickness ta of 0.5 to 3.0 mm and a complex elastic modulus $E^*a$ of 20 to 70 MPa,
wherein at an adjacent position at which the bead wires of the bead core and the carcass cords of the carcass ply become closest, a rubber thickness T0 of a clearance portion between the bead wires and the carcass cords is not less than 0.7 mm and the clearance portion includes a cushion rubber layer that is interposed between the reinforcing rubber layer and the carcass cords, the cushion rubber layer being formed of low elastic rubber having a complex elastic modulus $E^*b$ that is smaller than the complex elastic modulus $E^*a$ of the reinforcing rubber layer and with a difference thereof ($E^*a-E^*b$) being not less than 10 MPa.

In the bead wind structure, the periphery of the bead cores is coated through a reinforcing rubber layer of high elasticity having a specified thickness for reinforcing purposes. It is accordingly possible to restrict core deformation such as alignment shifts of the bead wires. Moreover, at an adjacent position at which the bead wires and the carcass cords become closest, a rubber thickness T0 (shown in e.g. FIG. 7(A)) of a clearance portion between the bead wires and the carcass cords is secured to be not less than 0.7 mm. Fretting of the carcass cords can also be effectively restricted through the synergetic effect of securing the rubber thickness T0 and of interposing the reinforcing rubber layer of high elasticity therebetween, and the bead durability can be improved while it is also expected to restrict core deformation as well.

A cushion rubber layer of low elasticity is further interposed between the reinforcing rubber layer and the carcass cords. With this arrangement, distortion can be eased while it is further possible to restrict blowout of carcass cords.

BRIEF DESCRIPTION OF THE SEVERAL VIEWS OF THE INVENTION

DETAILED DESCRIPTION OF THE INVENTION

Figure 1:
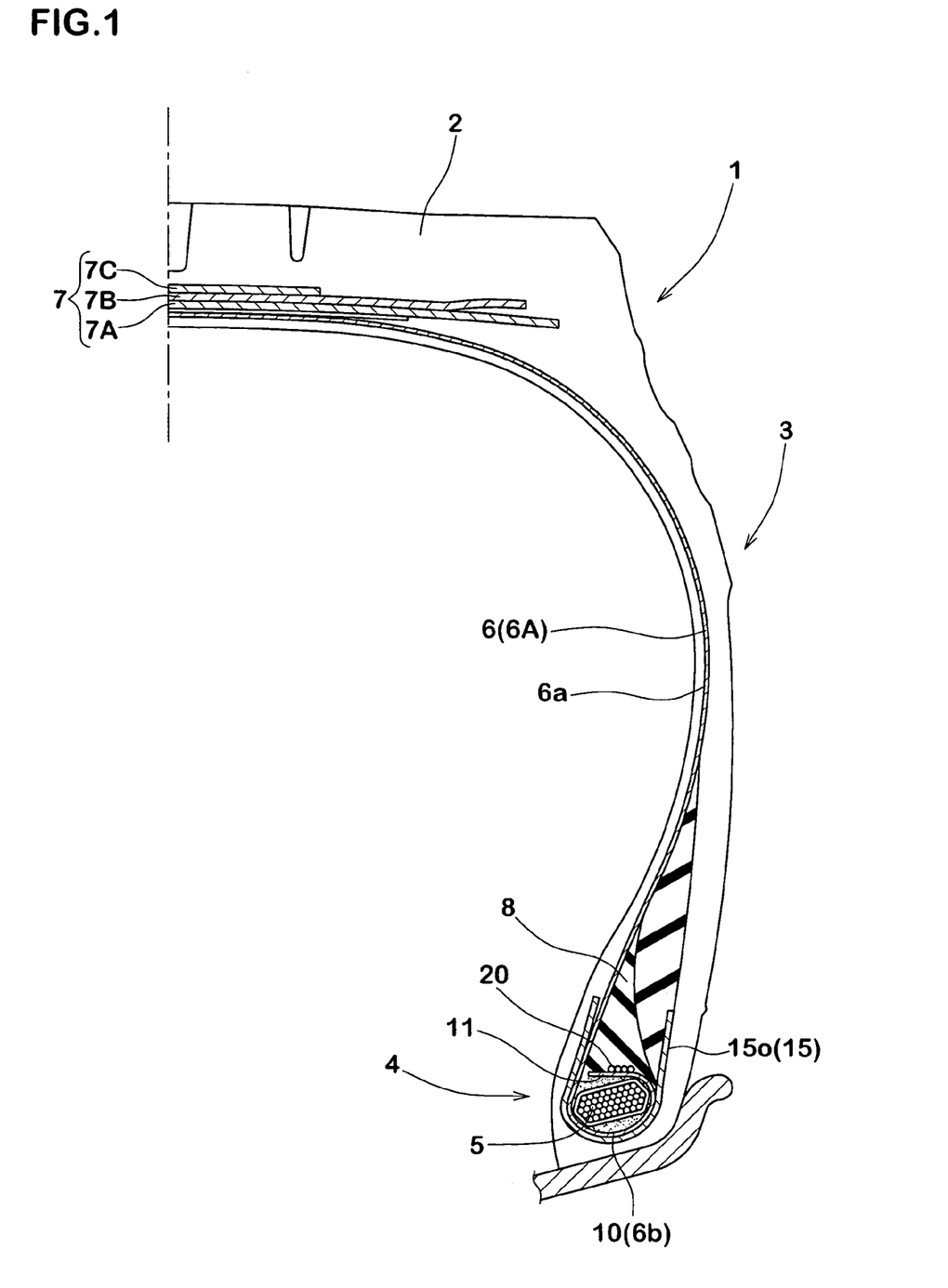
FIG. 1 is a sectional view illustrating one embodiment of the heavy duty tire of the present invention.
Figure 2:
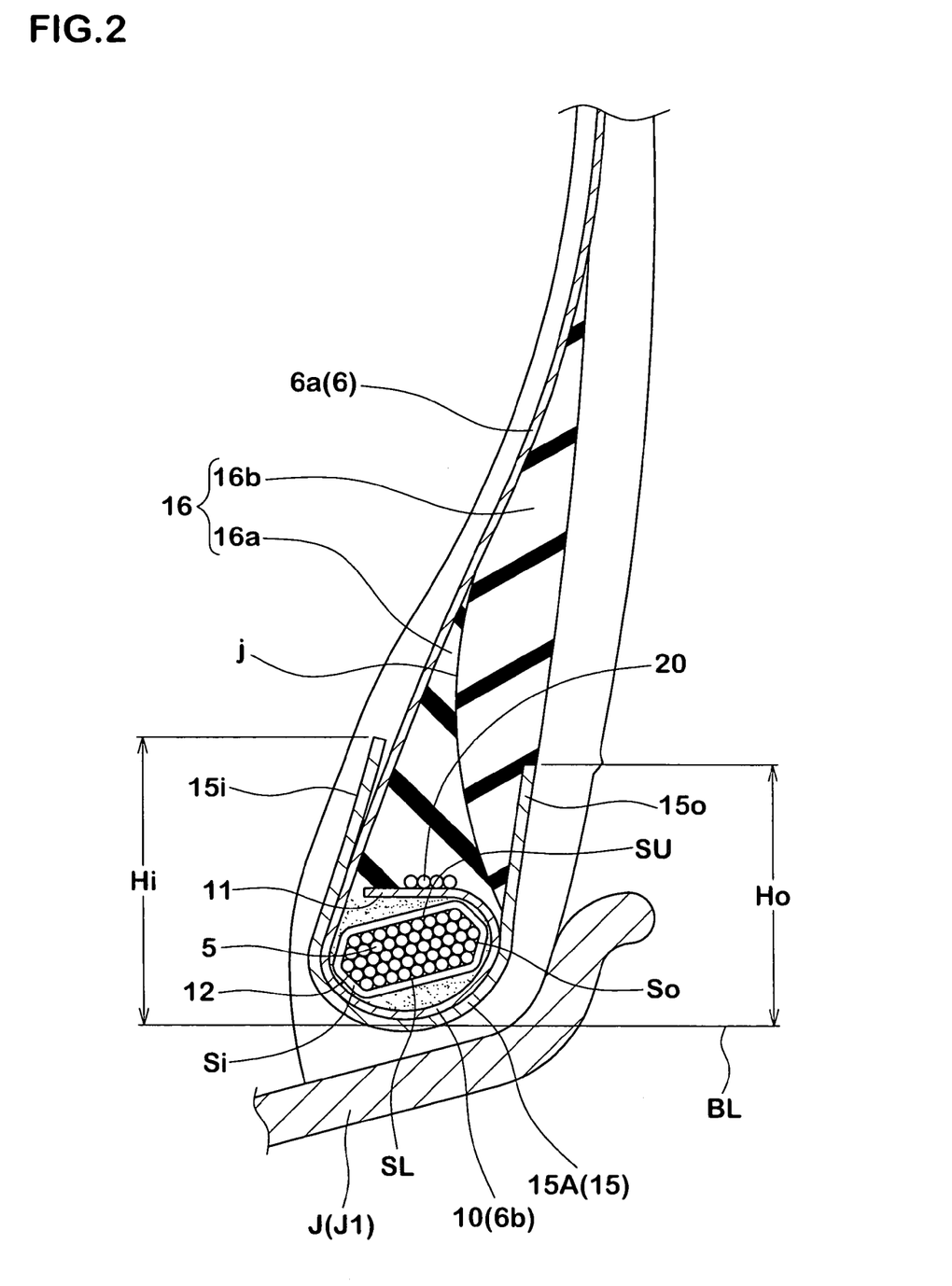
FIG. 2 is a sectional view illustrating its bead portion in enlarged form.
Figure 3:
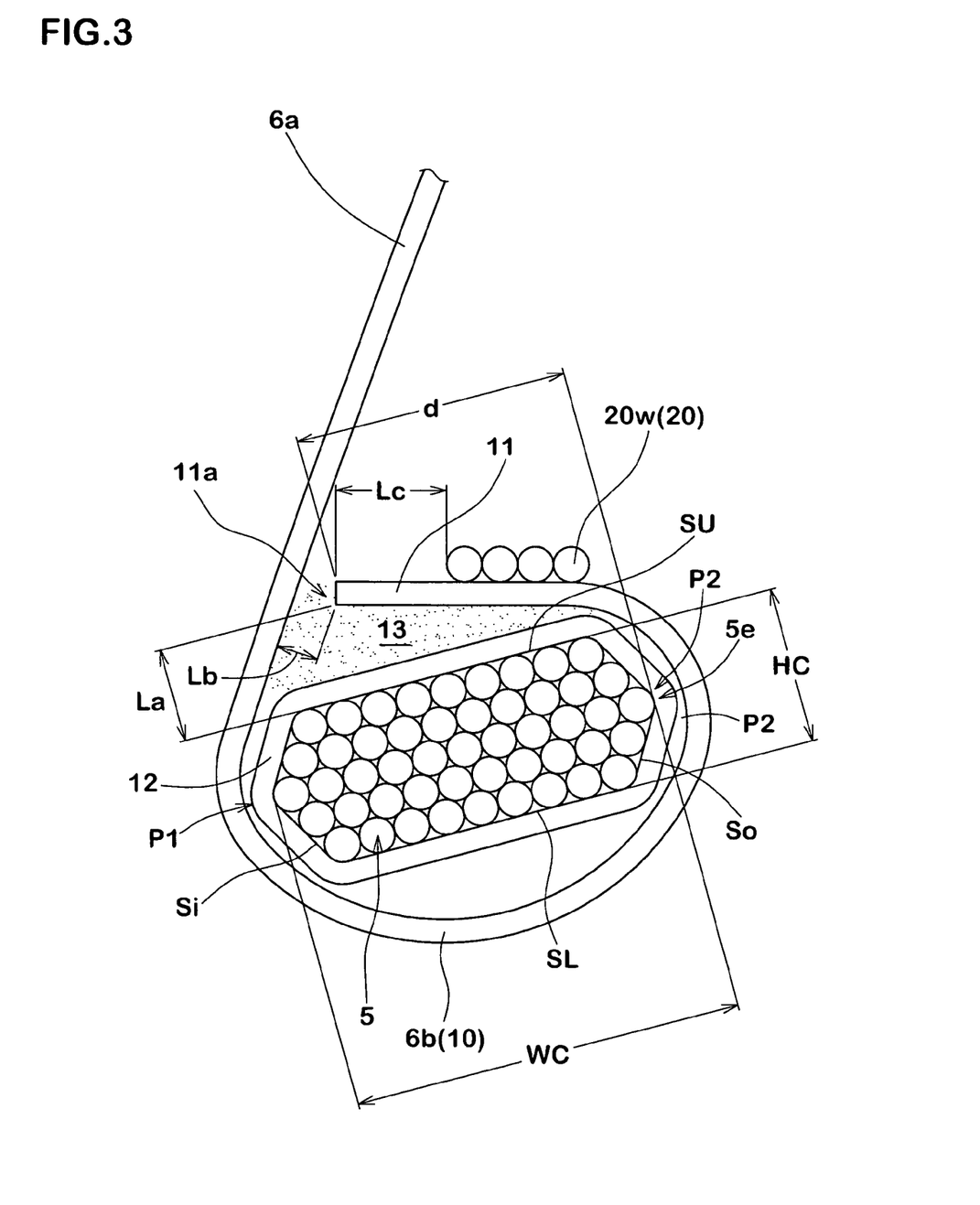
FIG. 3 is a sectional view illustrating a main portion of the bead portion in further enlarged formed.

One embodiment of the present invention will now be explained together with illustrated examples thereof. FIG. 1 is a sectional view illustrating the heavy duty tire of the present invention in a 50 kPa filled condition, and FIGS. 2 and 3 are sectional views illustrating a bead portion thereof in enlarged form.

In this respect, unless noted otherwise, dimensions of the respective parts of the tire are defined to be values that have been specified in a 50 kPa filled condition upon mounting the tires to a normal rim, filling an internal pressure of 50 kPa, and applying no load thereon. In this respect, the term "normal rim" denotes a rim defined for each tire in accordance with a standardizing system including the standard on which the tire is based, and may be a normal rim according to JATMA, a "design rim" according to TRA and a "measuring rim" according to ETRTO.

Further, the term "bead base line BL" denotes a line in the tire axial direction that passes through a rim diameter position that is defined by the standard the tire is based upon.

Moreover, the complex elastic modulus is a value measured by using a viscoelasticity spectrometer under conditions for the temperature being 70° C., for the frequency 10 Hz, for the initial strain 10%, and for the dynamic strain ±1%.

In FIG. 1, the heavy duty tire 1 includes a carcass 6 that extends from a tread portion 2 over sidewall portions 3 up to bead cores 5 of bead portions 4, and a belt layer 7 that is disposed outside of the carcass 6 in the radial direction and inward of the tread portion 2.

The belt layer 7 includes not less than two, preferably not less than three belt plies employing belt cords made of steel (steel cords). The present embodiment illustrates a three-layered structure including a first belt ply 7A on an innermost side in the radial direction in which the belt cords are aligned at an angle of, for instance, 60☐15° with respect to the tire circumferential direction, and second and third belt plies 7B, 7C in which the cords are aligned at a small angle of, for instance 10 to 35° with respect to the tire circumferential direction. Since the belt layer 7 is arranged in that the belt cords mutually intersect among one of the plies, it serves to improve the belt rigidity and to reinforce the tread portion 2 through hoop effects.

The carcass 6 is constituted by a carcass ply 6A aligned at an angle of, for instance, 80°-90° with respect to the tire circumferential direction. The carcass ply 6A includes a series of ply turnup portions 6b along the both sides of the ply main body portion 6a that extends between the bead cores 5 and 5. The ply turnup portions 6b are turned up from inside to outside with respect to a tire axial direction.

As illustrated in FIG. 2 in enlarged form, the bead core 5 is constituted by a ring-like body in which bead wires made, for instance, of steel are wound in a multi-staged and multi-seriate form. The present embodiment illustrates a flat hexagonal shape having a horizontally long section. In this respect, the sectional shape of the bead core 5 may also be orthohexagonal or rectangular according to needs. In a bead core 5 having a hexagonal section, a surface that includes a longer side inside in the tire radial direction when seen in cross-section is defined to be a lower surface SL of the bead core 5 while a surface that includes a longer side outside in the tire radial direction is defined to be an upper surface SU of the bead core 5. Further, a surface that includes a bent side in a polygonal linear manner that joins the lower surface SL and the upper surface SU of the bead core 5 inside in the tire axial direction is defined to be an inner surface Si of the bead core 5. A surface on the opposite side that forms a bent side is defined to be an outer surface So.

The lower surface SL extends parallel to a sheet surface of a rim sheet J1 of a normal rim J so as to strengthen the fitting force thereof with the rim over a wide range. The normal rim J is a tubeless 15O tapered rim, and the lower surface SL and the upper surface SU of the bead core 5 accordingly incline at an angle of approximately 15° with respect to a tire axial line. In this respect, the term "approximately 15°" is to permit manufacture errors and denotes a range of 15°☐2°.

In the bead-wind structure, since the ply turnup portions 6 are wound around the bead cores 5, a strong rotation moment is generated around the bead cores through tension force applied onto the carcass cords 20. Core deformation such as alignment shift or alignment collapse (arrangement confusion) of the bead wires 5w is consequently apt to happen in the bead cores 5. It might also happen that contact pressure with the carcass cords strongly acts at corner portions P1, P2 on the bead toe or heel sides of the bead cores 5 so as to cause fretting which may lead to breaks in carcass cords.

The bead core 5 is further apt to deform in a rotating direction around the sectional center thereof through rotation moment. Being dragged thereby, the bead portion 4 will also be deformed in a direction in which the toe end side is lifted from the rim sheet so that this will be of disadvantage in view of air-sealing properties. It will accordingly be necessary to restrict such rotation deformation.

The bead cores 5 are thus to be flatter as illustrated in FIG. 3 when compared to former ones. More particularly, a ratio WC/HC of a core width WC in a direction parallel to the upper surface SU to a core thickness HC in a direction orthogonal to the upper surface SU is defined to be not less than 1.7, preferably not less than 2.0. Achieving a super-flat structure by increasing the ratio WC/HC will reduce rotation deformation of the bead cores 5. As a result, it will be possible to prevent lifting of the toe side from the rim sheet J1 so as to secure air-tightness with the rim J. In this respect, a ratio WC/HC exceeding 2.8 will be unfavorable since flattening will be too excess so that the bending rigidity is reduced that may lead to lack in fitting force with the rim J. More particularly, the ratio WC/HC is defined to be in the range of 1.7 to 2.8 or 1.7 to 2.5, and accordingly, the ratio HC/WC is defined to be in the range of 0.4 to 0.6 in the present embodiment.

In the present embodiment, a wrapping layer 12 is disposed around the bead cores 5. The wrapping layer 12 is constituted from, for instance, a woven cloth employing organic fiber, a non-woven cloth, or a ply disposed with organic fiber yarn. Since the wrapping layer 12 coats the outer peripheral surface of the bead cores 5, it is possible to prevent direct contact between the carcass cords and the bead wires so that damages of the carcass cords through fretting are prevented.

Next, the bead portions 4 are of the bead-wind structure in which the ply turnup portions 6b of the carcass 6 passes proximate of the upper surface SU of the bead cores 5.

As illustrated in FIG. 3, the ply turnup portion 6b includes a main portion 10 and a sub-portion 11 continuing therefrom. The main portion 10 curves along the inner surface Si, the lower surface SL and the outer surface So. The sub-portion 11 continues from the main portion 10 and extends upon inclining towards the ply main body portion 6a proximate of the upper surface SU of the bead core. At this time, the ply turnup portions 6 are not partially bent, that is, they do not undergo so-called molding (press deformation). They are accordingly not formed with bent portions obtained through plastic deformation. The ply turnup portions 6 accordingly include only portions that are elastically curved in a smooth arc-like manner so that degradations in strength of the carcass cords are prevented.

In this respect, the sub-portion 11 denotes a portion that is located further outside in the radial direction than the upper surface SU (or its extension) of the bead core 5. The sub-portion 11 is inclined in a direction in which the distance thereof with respect to the upper surface SU increases in approaching the tip end 11a. A filling rubber 13 having a substantially triangular section is disposed between the sub-portion 11 and the upper surface SU (in the present embodiment, between the same and the wrapping layer 12).

Further, for constraining the sub-portion 11 and for preventing spring back of the carcass cords, an auxiliary cord layer 20 for pressing the sub-portion is formed outside of the sub-portion 11 in the tire radial direction.

The auxiliary cord layer 20 is constituted from a wound body in which auxiliary cords made of steel (steel cords) 20w are wound by not less than one round in the tire circumferential direction. By preferably winding the same spirally by two to six rounds, hoop-tightening effects for the sub-portion 11 are improved. With this arrangement, it is possible to restrict spring back without the necessity of performing molding to the carcass cords. It is further possible to prevent degradations in strength of the cords caused through molding. It is further possible to stably maintain the sub-portion 11 in intended shape.

The auxiliary cords 20w preferably have a cord strength of 2000 to 4000N, wherein when it is less than 2000N, it will be necessary to increase the number of winding cords for exhibiting sufficient hoop-tightening effects so that the productivity tends to be harmed. On the other hand, when it exceeds 4000N, the auxiliary cords 20w will be too hard so that the workability of winding tends to be harmed. Rubberized cords in which the periphery is preliminarily coated with topping rubber are employed as the auxiliary cords 20w. In this respect, if organic fiber cords are used for the auxiliary cords 20w, the cords will be relatively largely expanded through, for instance, pressure and heat applied during vulcanization so that the sub-portion 11 can not be stably maintained in intended shape.

However, when such an auxiliary cord layer 20 is employed for tightening the sub-portion 11 so as to contact and face along the upper surface SU of the bead core 5, the degree of bending of the carcass cords is increased. Through the auxiliary cord layer 20, a new partial bent is accordingly caused in the carcass cords, for instance, proximate of the outer end 5e of the bead core 5 in the tire axial direction so that it will be difficult to reliably restrict rupture of cords.

For this reason, the filling rubber 13 having a substantially triangular shape is disposed between the sub-portion 11 and the upper surface SU (in the present embodiment, between the same and the wrapping layer 12) as already mentioned. With this arrangement, the sub-portion 11 is made to incline with respect to the upper surface SU at an angle θ that is larger than 0°, preferably not less than 100, and more preferable not less than 15°.

With this arrangement, the degree of bending of the carcass cords can be suitably eased to reliably prevent rupture of cords. It also restricts defective moldings such as air residue originating from spring back of carcass cords. In this respect, where the angle θ is too large, there may happen a slip and shift of the auxiliary cord layer 20. This will weaken engaging force of the ply turnup portions 6b and might cause occurrence of blowout. The upper limit of the angle θ is thus preferably not more than 60°, and further not more than 45°.

Figure 4:
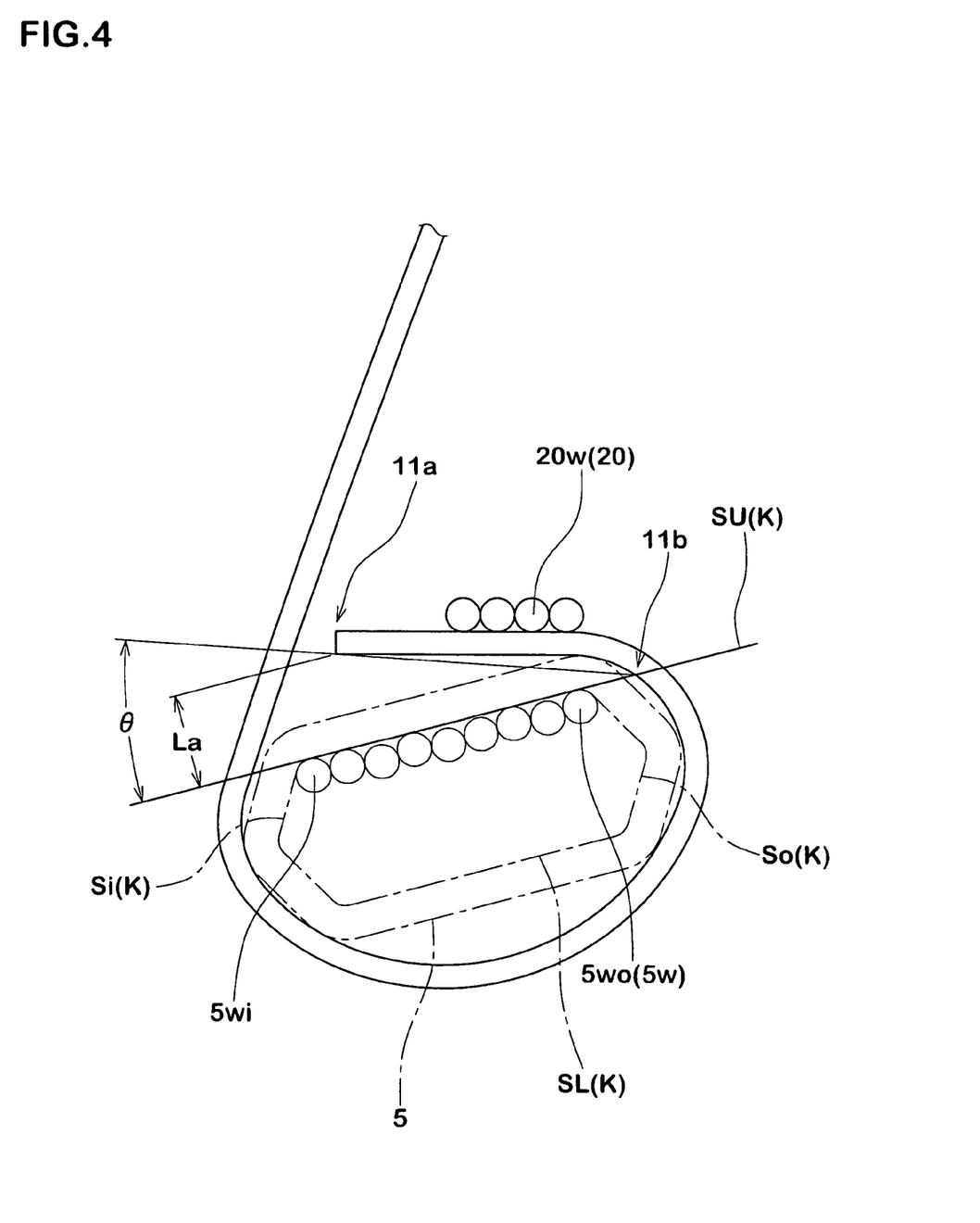
FIG. 4 is a sectional view illustrating a ply turnup portion in details.

In this respect, as illustrated in FIG. 4, the angle θ is defined to be an angle that is formed by a straight line connecting a lower end position 11b (of the sub-portion 11) at which the sub-portion 11 intersects the upper surface SU of the bead core 5 (or its extension) and a tip end 11a of the sub-portion 11 forms with respect to the upper surface SU. It may happen with the bead cores 5 that the bead wires 5w are not aligned linearly but vary in vertical directions. At this time, the upper surface SU of the bead cores 5 will assume a non-planar surface. In such an instance, it is approximated by a tangential line K that contacts a bead wire 5wo that is located outermost in the tire axial direction and a bead wire 5wi that is located innermost in the tire axial direction from among the bead wire rows that appear on the upper surface SU.

Further, a distance La from the upper surface SU to the tip end 11a of the sub-portion 11 is defined to be in the range of 1.0 to 10 mm. It is further required to set a distance d between the tip end 11a and an outer end 5e of the bead core 5 in the tire axial direction to be not less than 5 mm. This distance d is a value in a direction parallel to the upper surface SU of the bead core 5.

This is because where the distance La is larger than 10 mm, stress at the time of deformation of the tire tends to strongly act onto the tip end 11a of the sub-portion 11. Damages are apt thus apt to occur at the tip end 11a. Where it is less than 1.0 mm, the degree of bending of the carcass cords can not be sufficiently eased. In view of these facts, it is preferable to set the upper limit for the distance La to not more than 7 mm. Where the distance d is less than 5 mm, the engaging force of the ply turnup portions 6b will become insufficient. Accordingly, with increased temperature caused through accumulation of braking heat or similar as already discussed, the positional shift in the blowout direction tends to be large so as to cause loosening of carcass cords. In this respect, the distance d is defined such that the tip end 11a does not contact the ply main body portion 6a, that is, a distance Lb of the tip end 11a from the ply main body 6a is larger than 0, and preferably not less than 1.0 mm.

In this respect, the auxiliary cord layer 20 is preferably arranged in that a distance Lc between its inner end in the tire axial direction and the tip end 11a of the sub-portion 11 along the sub-portion 11 is 1 to 10 mm, wherein when it is less than 1 mm, the sub-portion 11 will come off from the auxiliary cord layer 20 so that hoop-tightening effects of the auxiliary cord layer 20 are not exhibited. On the other hand, when it exceeds 10 mm, the constraining force on the tip end 11a side will become insufficient so that the distance La and the distance d become unstable, and it will be impossible to improve the bead durability in neither case.

Next, the filling rubber 13 is constituted from a rubber composition of low elasticity exhibiting superior shock and stress easing effects. This arrangement serves to absorb distortion at the tip end 11a of the sub-portion 11 and to prevent damages. More particularly, a rubber composition having a complex elastic modulus of E*a of 5 to 15 MPa is suitable. Where the complex elastic modulus of E*a is less than 5 MPa, the rubber will become excessively soft so that the distortion of the tip end 11a of the sub-portion 11 tends to be large. When it exceeds 15 MPa, the softness of the filling rubber 13 will become short so that performances of easing and absorbing distortion will be degraded. In view of these facts, it is preferable to set the lower limit value for the complex elastic modulus E*a to not less than 6 MPa and further not less than 7 MPa and to set the upper limit value to not more than 13 MPa and further not more than 11 MPa. The complex elastic moduli are values measured by using a viscoelasticity spectrometer under conditions for the temperature being 70° C., for the frequency 10 Hz, for the initial strain 10%, and for the dynamic strain ±1%.

Particularly in case of increased temperature caused through accumulation of braking heat or similar as already discussed, the positional shift in the blowout direction tends to be large. In other words, loosening of carcass cords is caused so that the thermal bead durability tends to be degraded.

For this purpose, the bead portions 4 are formed with a bead reinforcing layer 15 of substantially U-shaped form. The bead reinforcing layer 15 is constituted from a cord ply in which steel cords are aligned at an angle of, for instance, 10 to 60°, for instance 10° to 40° or 15 to 60° with respect to a tire circumferential line, and includes, as illustrated in FIG. 2, a curved portion 15A, an outer piece 15o outside of the curved portion 15A in the tire axial direction, and an inner piece 15i inside of the curved portion 15A in the tire axial direction. The curved portion 15A faces along the main portion 10 of the ply turnup portion 6b and passes inward thereof in the radial direction. The outer piece 15o parts from the main portion 10 and inclines outside in the tire axial direction in reaching outward in the radial direction. The inner piece 15i extends along the inner side surface of the ply main portion 6a in the tire axial direction.

In this respect, the inclining direction of the steel cords of the bead reinforcing layer 15 with respect to the tire circumferential direction is different from the inclining direction of the carcass cords 6w of the ply turnup portions 6b with respect to the tire circumferential direction. Accordingly, since the steel cords intersect with the carcass cords 20 at the curved portion 15A, the rigidity is improved so as to improve effects of restricting rotation deformation of the bead cores 5.

Here, where the temperature of the bead portions 4 has excessively increased through heat accumulation of braking heat, the rubber within the beads that has softened through the heat will be pressed by the rim flange when load is applied thereto so that it tends to move to the bead toe side. Accompanying this movement, the positional shift of the ply turnup portion 6b to the blowout direction will become remarkable and it is supposed that the thermal bead durability is degraded. The outer piece 15o serves to shield movements of the rubber to the bead toe side so that positional shift in the blowout direction is thereby restricted and thus to improve thermal bead durability. For this purpose, a radial directional height Ho of an outer end of the outer piece 15o from the bead base line BL is defined to be not less than 25 mm. The above effects can not be expected where it is less than 25 mm.

On the other hand, the inner piece 15i serves to restrict collapsing of the bead portions 4 when load it applied thereon. Particularly the radial directional height Hi of its outer end from the bead base line BL is set to be larger than the height Ho of the outer piece 15o. With this arrangement, focusing of stress at the outer end of the outer piece 15o is reduced so as to effectively restrict damages at the outer end of the outer piece 15o. For this purpose, it is preferable to secure a difference in heights (Hi−Ho) to be not less than 3.0 mm. In this respect, since the inner piece 15i is protected by adjoining the ply main body portion 6a, stress acting on its outer end will be small so that damages at the outer end of the inner piece 15i hardly occurs also when Hi>Ho comes true.

However, when the heights Hi, Ho are too large, the outer ends of the inner and outer pieces 15i, 15o will come closer to the sidewall portion 3 side which is subjected to large deformations, damages are more likely to occur. This will also act against weight saving. The upper limit value for the height Hi is thus preferably not more than 60 mm and the upper limit value for the height Ho not more than 40 mm.

In this respect, a bead apex 16 that extends in a tapered manner towards outside in the tire radial direction upon passing through the ply main body portion 6a and the outer piece 15o is disposed outside of the sub-portion 11 in the radial direction. In the present embodiment, the bead apex 16 includes an inner apex portion 16a that is disposed inside in the tire radial direction and an outer apex portion 16b disposed outside thereof. In this respect, the inner and outer apex portions 16a, 16b are partitioned by a borderline j that inclines from the inner end of the sub-portion 11 towards the ply main body portion 6a.

In the present embodiment, a complex elastic modulus E*b of the inner apex portion 16a is defined to be not less than 20 MPa. With this arrangement, distortion caused through collapsing of the ply main body portion 6a when load is applied thereto can be received by the upper surface SU of the bead core 5. In this respect, where the complex elastic modulus E*b exceeds 60 MPa, the elasticity of this portion is excessively increased. This is of disadvantage since it will consequently cause distortion to be focused proximate of the outer end of the outer piece 15o to cause damages. In view of those facts, the lower limit value of the complex elastic modulus E*b is preferably not less than 25 MPa and further not less than 30 MPa while the upper limit value is preferably not more than 50 MPa and further not more than 40 MPa.

Moreover, a complex elastic modulus E*c of the outer apex portion 16b is smaller than that of the inner apex portion 16a, and the complex elastic modulus E*c is preferably not less than 3 MPa and further not less than 3.5 MPa. The upper limit is desirably not more than 7 MPa and further not more than 5 MPa. When the complex elastic modulus E*c is less than 3 MPa, the difference in elastic moduli with the inner apex portion 16 will become too large so that damages caused from proximate of the borderline j tend to easily occur, and on the other hand, when it exceeds 7 MPa, the rigidity of the entire bead portion 4 will become too high which is not preferable since damages proximate of the outer end of the outer apex portion 16b will be likely to occur.

Figure 7A:
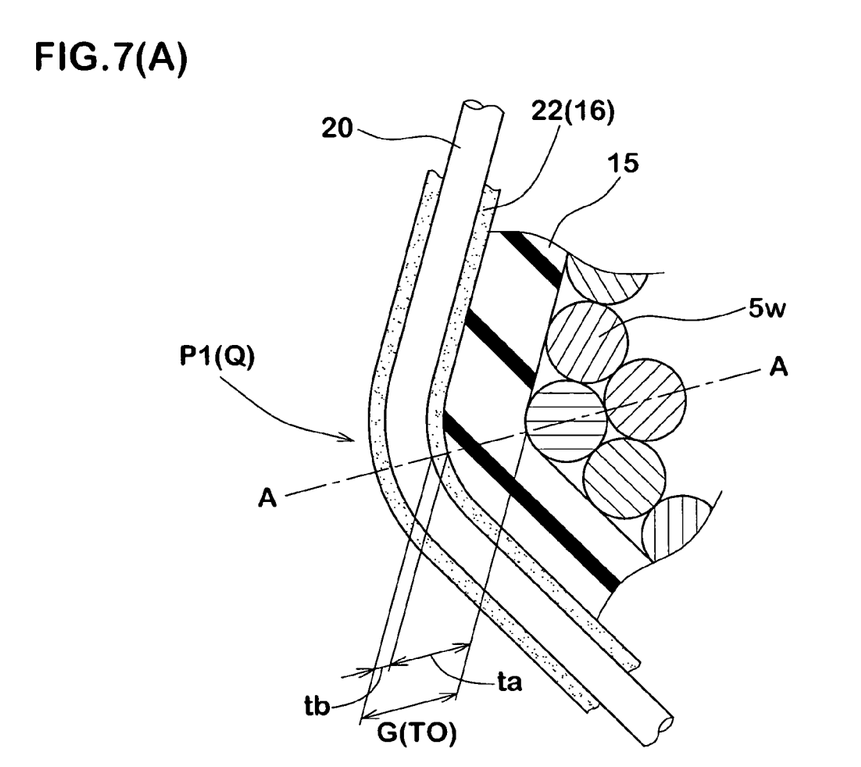
FIG. 7(A) is a sectional view showing a clearance portion between bead wires and carcass cords at proximate positions in enlarged form.
Figure 7B:
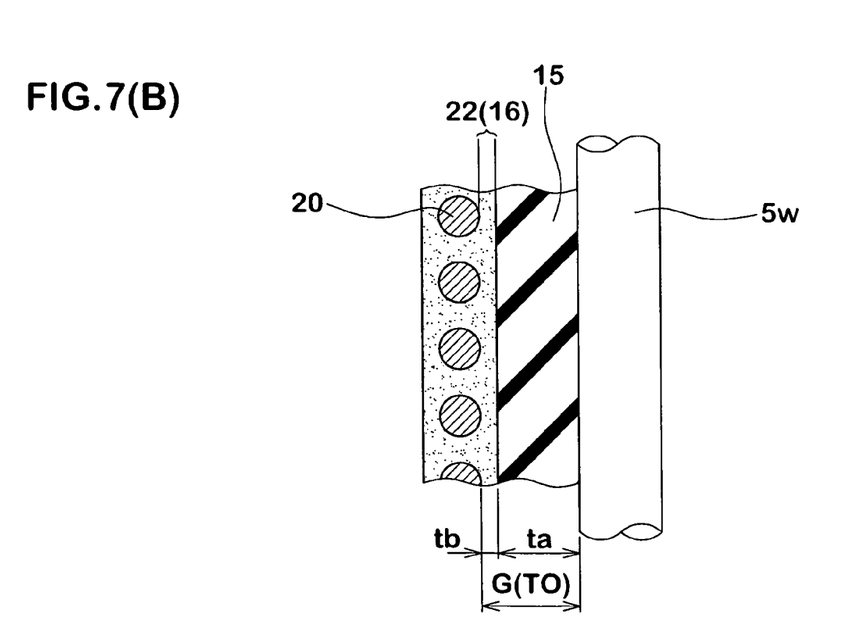
FIG. 7(B) is a sectional view along line A-A.
Figure 8A:
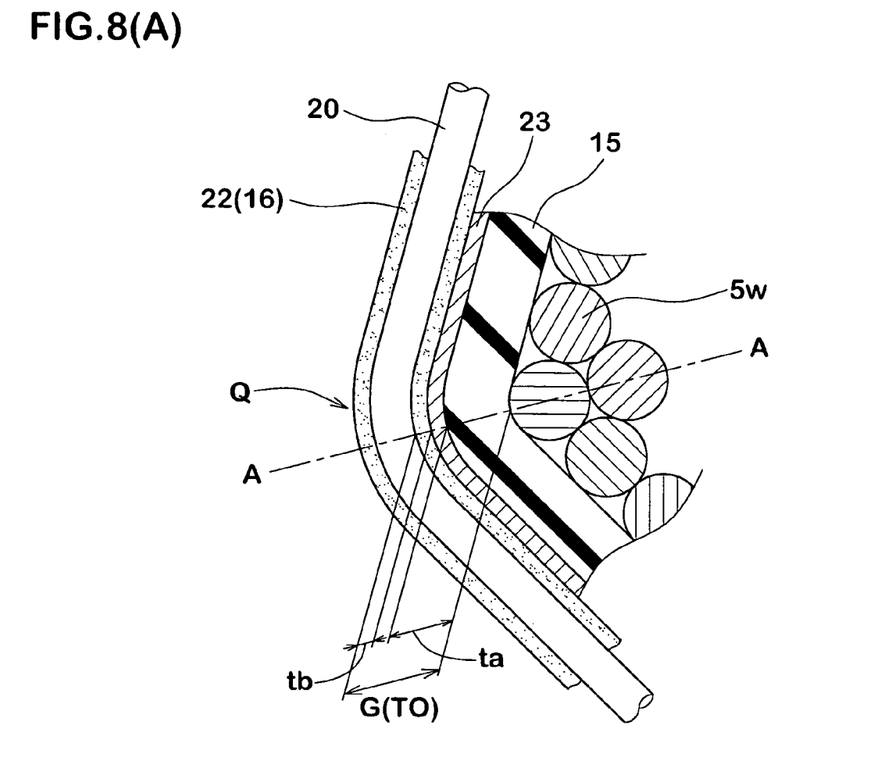
FIG. 8(A) is a sectional view illustrating an adjoining portion of another embodiment in enlarged formed.
Figure 8B:
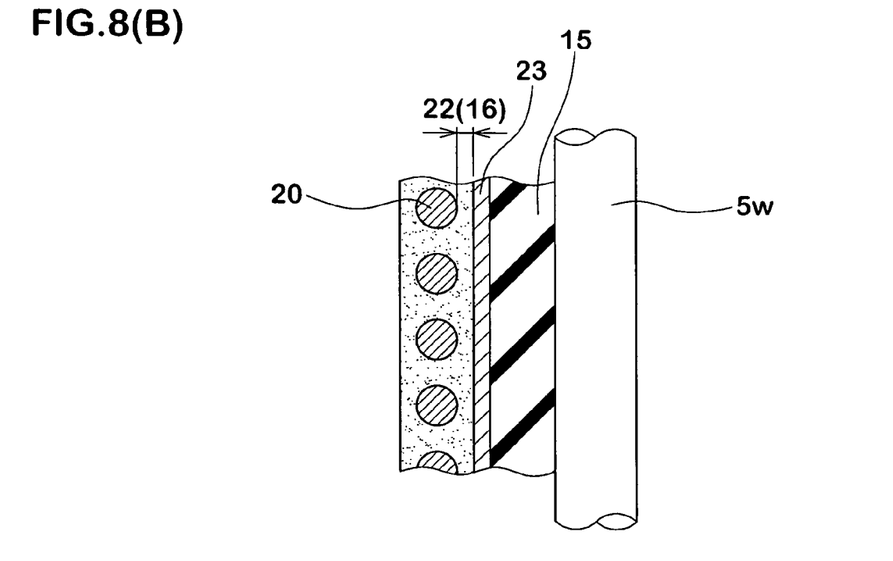
FIG. 8(B) is a sectional view along line A-A.

Next, FIGS. 5 to 7(A) and 7(B) illustrate one embodiment of another invention and FIGS. 8(A) and 8(B) illustrate another embodiment thereof. In this respect, as for structures that are not particularly mentioned herein, the structure of the above embodiment as illustrated in FIGS. 1 to 4 is employed.

The other invention is characterized by the following arrangements (1) to (3) for restricting bead deformation or fretting.

Figure 5:
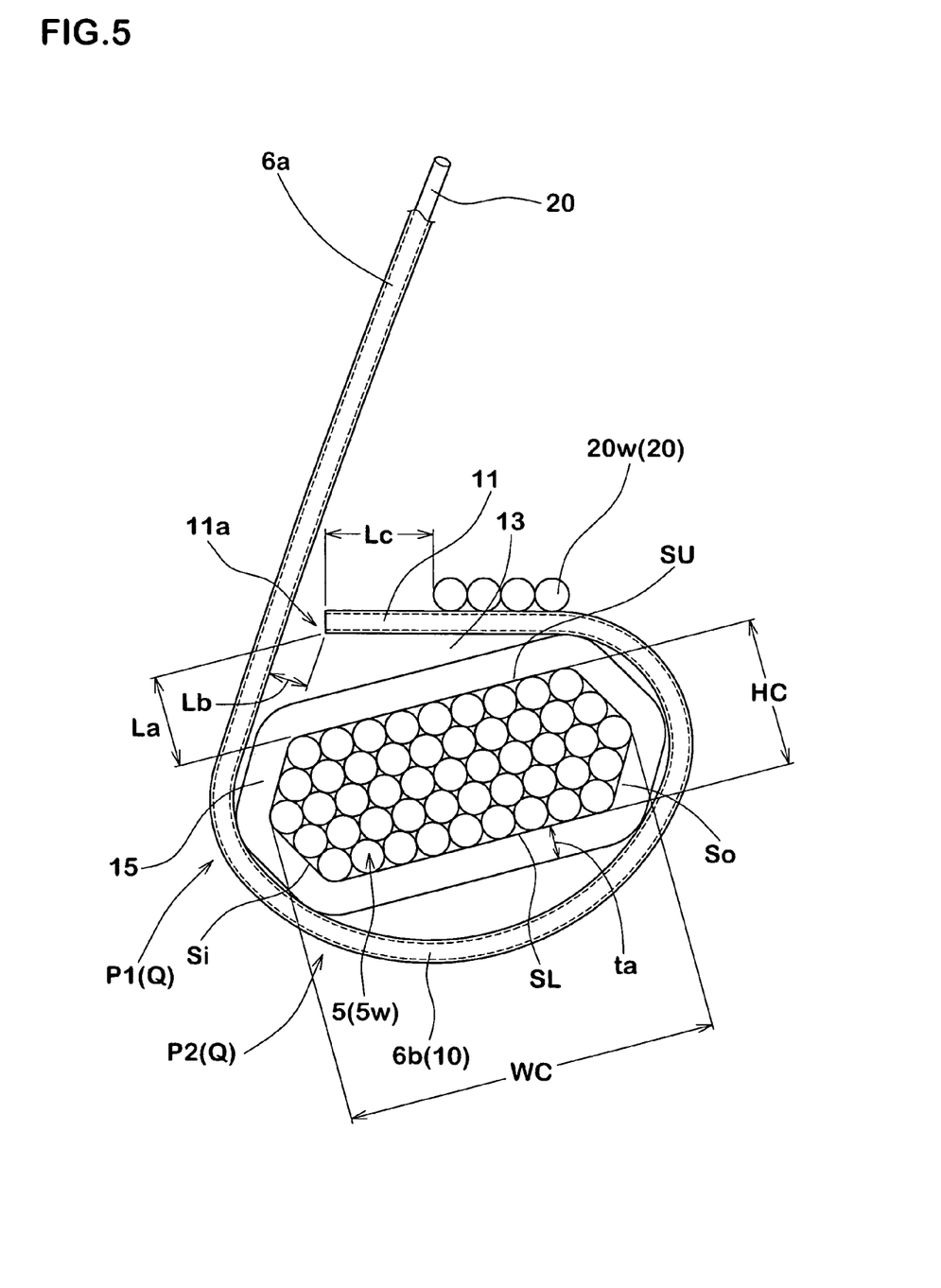
FIG. 5 is a sectional view illustrating a main portion of another bead portion.
Figure 6:
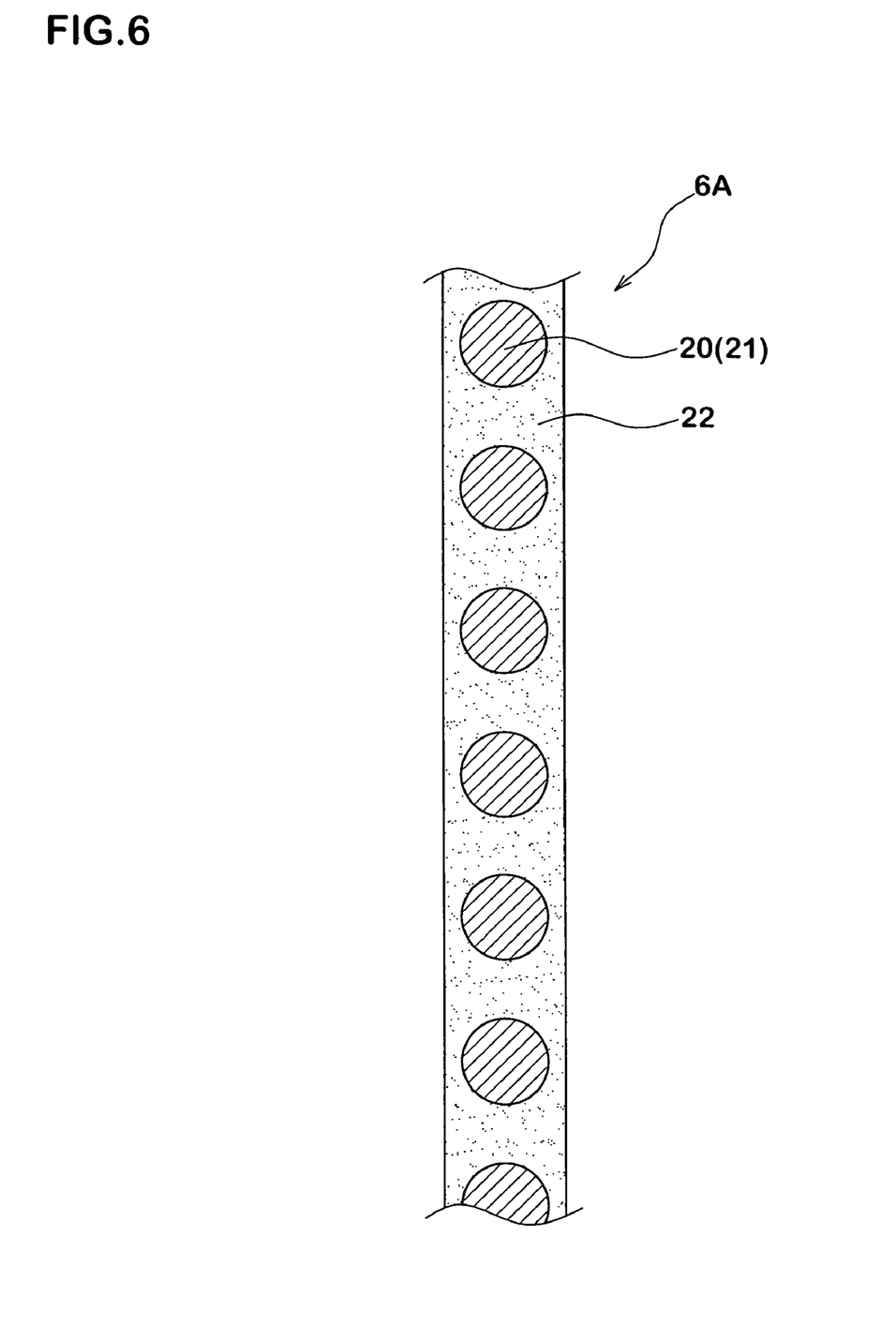
FIG. 6 is a sectional view for explaining a carcass ply.

(1) The periphery of the bead cores 5 is coated by a reinforcing rubber layer 15 made of high elastic rubber (as illustrated in FIG. 5).

(2) At an adjacent position Q at which the bead wires 5w and the carcass cords 20 become closest (in the present embodiment, the corner portions P1, P2), a rubber thickness T0 (as illustrated in FIGS. 7(A) and 7(B)) is secured to be not less than 0.7 mm. The rubber thickness T0 at the adjacent position Q denotes a rubber thickness of a clearance portion G between the bead wires 5w and the carcass cords 20.

(3) A cushion rubber layer 16 made of low elastic rubber (as illustrated in FIGS. 7(A) and 7(B)) is interposed between the reinforcing rubber layer 15 and the carcass cords 20 at the clearance portion G.

The reinforcing rubber layer 15 is made of high elastic rubber having a complex elastic modulus E*a of 20 to 70 MPa, and its thickness ta is defined to be in a range of 0.5 to 3.0 mm. In this respect, the thickness ta denotes a thickness between tangential lines of respective surfaces SU, SL, Si and So.

The rubber thickness T0 of the clearance portion G between the bead wires 5w and the carcass cords 20 at the adjacent position Q as illustrated in FIGS. 7(A) and 7(B) is defined to be not less than 0.7 mm. This rubber thickness T0 is a value including the thickness ta of the reinforcing rubber layer 15.

Further, the cushion rubber layer 16 is interposed between the reinforcing rubber layer 15 and the carcass cords 20 at the clearance portion G. This cushion rubber layer 16 is formed of low elastic rubber which complex elastic modulus E*b is smaller than the complex elastic modulus E*a of the reinforcing rubber layer 15, and the difference thereof (E*a−E*b) is not less than 10 MPa. The present embodiment illustrates a case in which the rubber within the clearance portion G is of two-layered structure including the reinforcing rubber layer 15 and the cushion rubber layer 16. In the present example, the topping rubber layer 22 that forms the carcass ply 6A accordingly constitutes the cushion rubber layer 16.

In this manner, since the periphery of the bead cores 5 is coated and reinforced with a reinforcing rubber layer 15 of high elasticity having a specified complex elastic modulus E*a and a specified thickness ta, core deformation such as alignment shift and alignment collapse of the bead wires 5w can be effectively prevented. Moreover, the rubber thickness T0 of the clearance portion G is secured to be not less than 0.7 mm at the adjacent position Q. Synergetic effects of securing the rubber thickness T0 and interposing the highly elastic reinforcing rubber layer 15 therein will effectively restrict also fretting of the carcass cords 20 that is caused through friction with the bead wires, and the bead durability can be improved while it is also expected to restrict core deformation as well.

In this respect, while the wrapping layer 12 as illustrated in the embodiment of FIGS. 1 to 4 can also be employed, the thickness thereof is defined to be small. In this respect, the thickness of the wrapping layer 12 is also included in the rubber thickness T0. Moreover, the filling rubber 13 is filled into another space formed between the reinforcing rubber layer 15 and the ply turnup portion 6b.

At this time, when only the highly elastic reinforcing rubber layer 15 is present at the clearance portion G, there will be a fear that blowout is caused at the carcass cords 20 when load is applied thereto, particularly impulsive load acts thereon. However, since the low elastic cushion rubber layer 16 is interposed at the clearance portion G, distortion can be eased, and blowout of the carcass cords can be simultaneously prevented as well.

In this respect, where the complex elastic modulus E*a is less than 20 MPa, and the thickness ta is less than 0.5 mm, reinforcement and protection of the bead cores 5 will be excessively small so that restriction of core deformation and fretting will become insufficient. In this respect, restriction of fretting will also be insufficient when the rubber thickness T0 is less than 0.7 mm. On the other hand, when the complex elastic modulus E*b exceeds 70 MPa, disadvantages will be caused in that a tendency of blowout exists since strains will focused at the peripheral rubber when performing running. When the thickness ta exceeds 3.0 mm, costs will unnecessarily increase since excess rubber will be used. Blowout of carcass cords is also likely to occur when the difference (E*a−E*b) becomes less than 10 MPa.

In view of those facts, it is preferable to set the lower limit value for the complex elastic modulus E*a to not less than 20 MPa and the upper limit value thereof to not more than 70 MPa. The lower limit value of the thickness ta is preferably set to not less than 0.3 mm and the upper limit value to not more than 3.0 mm. The lower limit of the difference (E*a−E*b) is preferably not less than 20 MPa. The upper limit of the difference (E*a−E*b) is preferably not more than 60 MPa, and when this value is exceeded, strains will be focused at the peripheral rubber so that a tendency to blowout is caused. The difference is accordingly more preferably not more than 50 MPa. The upper limit value for the rubber thickness T0 is preferably set to not more than 2.0 mm due to the reasons mentioned above. In this respect, the thickness tb of the cushion rubber layer 16 is preferably not less than 0.1 mm in view of preventing blowout.

At this time, since strong pressure acts between the carcass cords 20 and the bead cores 5 due to vulcanization stretch when performing tire vulcanization molding, it will be difficult to secure the rubber thickness T0 at the clearance portion G to be not less than 0.7 mm. Thus, prior to tire vulcanization molding, at least a portion of the reinforcing rubber layer 15 corresponding to the adjacent position Q is preferably vulcanized (also including semi-vulcanization). In this respect, EBR irradiation employing electron rays is suitably employed as a method of vulcanization (also including semi-vulcanization). Besides this method, it is also possible to perform, for instance, vulcanization through heating the entire reinforcing rubber layer 15 with the bead cores 5 in a coated condition.

Another embodiment is illustrated in FIGS. 8(A) and 8(B). The drawings illustrate an example in which the rubber within the clearance portion G at the adjacent position Q includes not less than three layers including the reinforcing rubber layer 15 and the cushion rubber layer 16. In the present embodiment, an example using a three-layered structure is described.

More particularly, the three-layered structure includes the reinforcing rubber layer 15, the topping rubber layer 22 of the carcass ply 6A, and an intermediate layer 23 formed therebetween. The topping rubber layer 22 forms the cushion rubber 16. The intermediate layer 23 coats the periphery of the reinforcing rubber layer 15 in the present embodiment. The intermediate layer 23 is further arranged in that a difference (E*a−E*e) between its complex elastic modulus E*e and the complex elastic modulus E*a is smaller than 10 MPa for easing the difference in elasticity between the topping rubber layer 22 and the reinforcing rubber layer 15 to restrict interlayer peeling. Where required, the cushion rubber layer 16 may be constituted from the intermediate layer 23. In such an instance, a difference (E*a−E*f) of the complex elastic modulus E*f of the topping rubber layer 22 and the complex elastic modulus E*a is smaller than 10 MPa.

In this respect, where the difference (E*a−E*e) or the difference (E*a−E*f) is not less than 10 MPa, it is possible to consider that both of the topping rubber layer 22 and the intermediate layer 23 constitute the cushion rubber layer 16 also when E*b≠E*e and E*b≠E*f is satisfied. In other words, the cushion rubber layer 16 will at this time be of double-layered structure. In this respect, when the reinforcing rubber layer 15 is also in the above range of 20 to 70 MPa, it is possible to employ a multi-layered structure. It is also possible to interpose the bead wire topping rubber layer having a complex elastic modulus that does not fall within the above range of 20 to 70 MPa between the reinforcing rubber layer 15 and the bead wires 5w.

While particularly preferable embodiments of the present invention have been explained so far in details, the present invention is not limited to the illustrated embodiments alone but may be embodied upon modifying the same into various forms.

EXAMPLE 1

Heavy duty tires having a tire size of 11R22.5 and the basic structure of FIGS. 1-3 were manufactured according to specifications of Table 1 whereupon the bead durability of the respective sample tires were measured and compared with each other. Specifications other than those of Table 1 were common to all.

In this respect, the Comparative Example 1 had a structure as illustrated in FIG. 9(A) in which the ply turnup portions of the carcass were wound along outer surfaces of the bead apex rubber. A height h of the ply turnup portions from the bead base line was defined to be 37 mm.

(1) Bead Durability

<i> General Bead Durability:

A drum tester was employed and tires were made to run at a velocity of 20 km/h under the following conditions for the rim (7.50×22.5), the internal pressure (700 kPa) and the load (26.72kN×3), and driving times until damages were caused at the bead portion were measured. Evaluations are indicated as indices with the driving time of the Comparative Example 1 being defined as 100. The larger the values are, the more favorable they are.

<ii> Thermal Bead Durability:

The above bead durability test was performed in a condition in which the rim was heated to 130° C., and driving times until damages were caused at the bead portion were indicated as indices with that of the Comparative Example 1 being defined as 100.

TABLE 1

|  | Example 1 | Example 2 | Comparative Example 1 | Comparative Example 2 | Comparative Example 3 | Comparative Example 4 | Comparative Example 5 |
| --- | --- | --- | --- | --- | --- | --- | --- |
| Bead structure | Wind FIG. 1-3 | Wind FIG. 1-3 | Turnover FIG. 9(A) | Wind FIG. 1-3 | Wind FIG. 1-3 | Wind FIG. 1-3 | Wind FIG. 1-3 |
| Carcass |  |  |  |  |  |  |  |
| Moldings (Bent Portions) | NO | NO | NO | YES | NO | NO | NO |
| Distance La <mm> | 4 | 9 | — | 4 | 11 | 4 | 4 |
| Distance d <mm> | 7 | 7 | — | 7 | 7 | 7 | 3 |
| Angle θ <degrees> | 25 | 45 | — | 25 | 52 | 25 | 50 |
| Auxiliary Cord Layer | YES | YES | — | NO | YES | YES | YES |
| Number of Winding <number> | 4 | 4 | — | 4 | 4 | 4 | 4 |
| Filling Rubber | YES | YES | — | YES | YES | YES | YES |
| Complex Elastic Modulus <MPa> | 7.0 | 7.0 | — | 7.0 | 7.0 | 7.0 | 7.0 |
| Bead Reinforcing Layer | YES | YES | YES | YES | YES | YES | YES |
| Height Hi <mm> | 34 | 34 | 45 | 34 | 34 | 22 | 34 |
| Height Ho <mm> | 27 | 27 | 27 | 27 | 27 | 27 | 27 |
| General Bead Durability | 130 | 105 | 100 | 95 | 95 | 90 | 95 |
| Thermal Bead Durability | 110 | 110 | 100 | 110 | 95 | 110 | 95 |

It can be confirmed by the table that both of the general bead durability and thermal bead durability have improved in the products of the present embodiments.

EXAMPLE 2

Heavy duty tires (tire size 11R22.5) having the basic structure of FIGS. 1 and 2 and FIG. 5 specifications of Table 2 were manufactured on trial, and bead durability and core deformation was evaluated. Specifications other than those described in Table 2 are operationally identical.

(1) Bead Durability:

A drum tester was employed and tires were made to run at a velocity of 20 km/h under the following conditions for the rim (7.50×22.5), the standard internal pressure (700 kPa) and thrice the standard load (27.25kN×3), and driving times until damages were caused at the bead portion were measured. Evaluations are indicated as indices with the driving time of the Comparative Example 1 being defined as 100. The larger the values are, the more favorable they are.

(2) Core Deformation:

The tires were disassembled after performing the durability test for observing presence/absence of deformation of the bead cores such as alignment shift or alignment collapse of the bead wire.

(3) Blowout:

The tires were disassembled after performing the durability test for observing presence/absence of blowout.

TABLE 2

|  | Comparative Example 1 | Comparative Example 2 | Comparative Example 3 | Comparative Example 4 | Example 1 | Example 2 | Example 3 |
| --- | --- | --- | --- | --- | --- | --- | --- |
| Bead structure (FIG. *) | Non-Wind FIG. 9(A) | Wind FIGS. 1, 2, 5 | Wind FIG. 9(A) | Wind FIG. 2 | Wind FIGS. 1, 2, 5 | Wind FIGS. 1, 2, 5 | Wind FIGS. 1, 2 |
| Reinforcing Rubber Layer | NO | YES | YES | YES | YES | YES | YES |
| Complex Elastic Modulus E*a <MPa> | — | 8.0 | 15.0 | 80.0 | 50.0 | 25.0 | 50.0 |
| Thickness ta <mm> | — | 1.0 | 1.0 | 1.0 | 1.0 | 1.0 | 2.0 |
| Rubber Thickness T0 <mm> | 0.5 | 1.5 | 1.5 | 1.5 | 1.5 | 1.5 | 2.5 |
| Cushion Rubber Layer | YES | YES | YES | YES | YES | YES | YES |
| Complex Elastic Modulus E*b <MPa> | 8.0 | 8.0 | 8.0 | 8.0 | 8.0 | 8.0 | 8.0 |
| (Difference E*a − E*b) <MPa> | — | 0 | 7.0 | 72.0 | 42.0 | 17.0 | 42.0 |
| Thickness tb <mm> | 0.5 | 0.5 | 0.5 | 0.5 | 0.5 | 0.5 | 0.5 |
| Ellipticity of Bead Core (HC/WC) | 0.45 | 0.45 | 0.45 | 0.45 | 0.45 | 0.45 | 0.45 |
| Auxiliary Cord Layer | NO | YES | YES | YES | YES | YES | YES |
| Number of Winding <number> | — | 4 | 4 | 4 | 4 | 4 | 4 |
| Bead Reinforcing Layer | YES | YES | YES | YES | YES | YES | YES |
| Height Hi <mm> | 55 | 34 | 34 | 34 | 34 | 34 | 34 |
| Height Ho <mm> | 27 | 31 | 31 | 31 | 31 | 31 | 31 |
| Bead Durability | 100 | 115 | 118 | 110 | 130 | 125 | 140 |
| Core Deformation | NO | YES | YES | NO | NO | NO | NO |
| Blowout | NO | YES | YES | YES | NO | NO | NO |

It can be confirmed by the table that the products of the present embodiments are capable of restricting deformation of the bead cores, of remarkably improving the bead durability, and simultaneously restricting blowout of the carcass cords.

What is claimed is:

1. A heavy duty tire, comprising:
a carcass ply including a ply main body portion and ply turnup portions, wherein
the ply main body portion extends over sidewall portions to bead cores of bead portions while the ply turnup portions continue from the ply main body portion and are turned over from inward to outward in a tire axial direction around the bead cores,
each of the ply turnup portions includes a main portion and a sub-portion, the main portion curving along an axially inner surface a radially lower surface, and an axially outer surface of the bead core,
the sub-portion continues from the main portion and extends straight towards the ply main body portion in the vicinity of a substantially flat radially upper surface of the bead core, while inclining at an angle θ larger than 0° with respect to the upper surface of the bead core so that a distance between the tip end of the sub-portion and the upper surface of the bead core is within the range of 1.0 to 10 mm, the ply turnup portion is turned over around the bead core in a smooth curve;
an auxiliary cord layer is provided radially outside the sub-portion in each of the bead portions for pressing the sub-portion;
a filling rubber having a complex elastic modulus of 5 to 15 MPa is disposed in each of the bead portions between the sub-portion and the upper surface of the bead core;
a reinforcing rubber layer coats each of the bead cores at a coating thickness of 0.5 to 3.0 mm, the reinforcing rubber layer being made of a high modulus rubber having a complex elastic modulus $E^*a$ of 20 to 70 MPa, and
at an adjacent position at which bead wires of the bead core and carcass cords of the carcass ply are closest, a rubber thickness of a clearance portion between the bead wires and the carcass cords is not less than 0.7 mm, the clearance portion includes a cushion rubber layer interposed between the reinforcing rubber layer and the carcass cords, the cushion rubber layer is made of a low modulus rubber having a complex elastic modulus $E^*b$ smaller than the complex elastic modulus $E^*a$ of the reinforcing rubber layer, and the difference ($E^*a-E^*b$) therebetween is not less than 10 MPa.

2. The heavy duty tire as claimed in claim 1, wherein a core width of each of the bead cores measured in a direction parallel to said upper surface of the bead core is 1.67 to 2.5 times a core thickness of the bead core measured in a direction orthogonal to the upper surface of the bead core.

3. The heavy duty tire as claimed in claim 1, wherein the cushion rubber layer is a layer formed by a topping rubber of the carcass ply.

4. The heavy duty tire as claimed in claim 1, wherein the auxiliary cord layer is made of a steel cord wound at least once around the sub-portion.

5. The heavy duty tire as claimed in claim 1, wherein the bead portions each include a bead reinforcing layer, the bead reinforcing layer having a curved portion, an axially outer piece and an axially inner piece,
the curved portion extending along the main portion of the ply turnup portion and inside thereof in the radial direction,
the axially outer piece extending radially outwardly away from the main portion,
the inner piece extending and
along the axially inner surface of the ply main portion.

6. The heavy duty tire as claimed in claim 1, wherein the distance measured in a direction parallel to the upper surface of each said bead core between the axially outer end of the bead core and the tip end of the sub-portion is not less than 5 mm, and the distance Lb between the tip end of the sub-portion and the ply main body portion of the carcass ply is larger than 0.

7. The heavy duty tire as claimed in claim 6, wherein the distance Lb is not less than 1.0 mm.

* * * * *